(12) United States Patent
Koide et al.

(10) Patent No.: US 10,141,877 B2
(45) Date of Patent: Nov. 27, 2018

(54) CONTROLLER FOR PERMANENT MAGNET SYNCHRONOUS MOTOR, CONTROL METHOD, AND IMAGE FORMING APPARATUS

(71) Applicant: KONICA MINOLTA, INC., Chiyoda-ku, Tokyo (JP)

(72) Inventors: Yasuhiro Koide, Toyohashi (JP); Yuta Tachibana, Toyokawa (JP); Daichi Suzuki, Toyokawa (JP); Hiroyuki Yoshikawa, Toyohashi (JP)

(73) Assignee: Konica Minolta, Inc., Chiyoda-ku, Tokyo (JP)

( * ) Notice: Subject to any disclaimer, the term of this patent is extended or adjusted under 35 U.S.C. 154(b) by 0 days.

(21) Appl. No.: 15/784,347

(22) Filed: Oct. 16, 2017

(65) Prior Publication Data
US 2018/0123492 A1 May 3, 2018

(51) Int. Cl.
*H02P 21/00* (2016.01)
*H02P 21/06* (2016.01)
(Continued)

(52) U.S. Cl.
CPC ............... *H02P 21/06* (2013.01); *H02P 6/18* (2013.01); *H02P 25/03* (2016.02); *H02P 2207/05* (2013.01)

(58) Field of Classification Search
CPC ...... H02P 1/00; H02P 3/00; H02P 6/00; H02P 6/181; H02P 6/18; H02P 6/24; H02P 21/00; H02P 21/06; H02P 2207/05; H02P 25/00; H02P 23/00; H02P 25/021; H02P 25/023; H02P 27/04; H02P 27/06; H02P 27/045; H02P 1/42; H02P 25/10

USPC ............ 318/400.01, 400.02, 400.14, 400.15, 318/400.32, 400.07, 400.39, 400.4, 714, 318/715, 717, 721, 722, 779, 799, 800, 318/801, 811, 812, 430, 437, 445, 560, 318/568.22, 599, 632, 652, 661
See application file for complete search history.

(56) References Cited

U.S. PATENT DOCUMENTS

| | | | | |
|---|---|---|---|---|
| 6,396,229 B1 * | 5/2002 | Sakamoto | ................. | H02P 6/18 318/400.02 |
| 6,690,137 B2 * | 2/2004 | Iwaji | ......................... | H02P 6/18 318/430 |

(Continued)

FOREIGN PATENT DOCUMENTS

| JP | 2012-062909 A | 3/2012 |
|---|---|---|
| JP | 2015-133872 A | 7/2015 |

*Primary Examiner* — Antony M Paul
(74) *Attorney, Agent, or Firm* — Buchanan Ingersoll & Rooney PC

(57) ABSTRACT

A method for controlling a permanent magnet synchronous motor having a rotor using a permanent magnet, the rotor rotating by a rotating magnetic field caused by a current flowing through an armature is provided. The method includes: presuming, based on a target speed and an estimated speed that is an estimated value of a rotational speed of the rotor, whether or not a step-out occurs; correcting, when it is presumed that a step-out occurs, an estimated angle that is an estimated value of a position of magnetic poles of the rotor; and controlling, based on a post-correction estimated angle that is the estimated angle after the correction, a current flowing through the armature to cause the rotating magnetic field rotating at the target speed.

19 Claims, 23 Drawing Sheets

(51) Int. Cl.
*H02P 25/03* (2016.01)
*H02P 6/18* (2016.01)

(56) References Cited

U.S. PATENT DOCUMENTS 8,159,161 B2 * 4/2012 Tomigashi .............. H02P 6/183
318/400.01
2012/0062164 A1 3/2012 Sano et al.

* cited by examiner

FIG. 11

| TARGET SPEED ω* (SPEED COMMAND VALUE) | THRESHOLD Hω |
|---|---|
| ω001 | Hω1 |
| ω002 | Hω2 |
| ω003 | Hω3 |
| ω004 | Hω4 |
| ω005 | Hω5 |
| ⋮ | ⋮ |

| SPEED RATIO Rω | CORRECTION ANGLE dθ [rad] (DEGREE) |
|---|---|
| 0.99 | 0.0628 (3.6) |
| 0.98 | 0.1257 (7.2) |
| 0.97 | 0.1885 (10.8) |
| ⋮ | ⋮ |
| 0.90 | 0.6283 (36.0) |
| ⋮ | ⋮ |
| 0.76 | 1.5079 (86.4) |
| 0.75 | 1.5707 (90.0) |

| SPEED RATIO $R\omega$ | CORRECTION SPEED $d\omega$ |
|---|---|
| 0.99 | $d\omega 1$ |
| 0.98 | $d\omega 2$ |
| 0.97 | $d\omega 3$ |
| ⋮ | ⋮ |
| 0.90 | $d\omega 10$ |
| ⋮ | ⋮ |
| 0.76 | $d\omega 23$ |
| 0.75 | $d\omega 24$ |

CONTROLLER FOR PERMANENT MAGNET SYNCHRONOUS MOTOR, CONTROL METHOD, AND IMAGE FORMING APPARATUS

Japanese Patent application No. 2016-212248 filed on Oct. 28, 2016, including description, claims, drawings, and abstract of the entire disclosure is incorporated herein by reference in its entirety.

BACKGROUND

1. Technological Field

The present invention relates to a controller for permanent magnet synchronous motor, a control method, and an image forming apparatus.

2. Description of the Related Art

Permanent Magnet Synchronous Motors (PMSM) generally have a stator with windings and a rotor using a permanent magnet. In such permanent magnet synchronous motors, an alternating current is fed to the windings to cause a rotating magnetic field, which rotates the rotor synchronously therewith. The use of a vector control in which an alternating current is used as a vector component of a d-q coordinate system enables the rotor to rotate smoothly with a high efficiency.

Recent years have seen the widespread use of sensorless permanent magnet synchronous motors. Such a sensorless permanent magnet synchronous motor has no encoder and no magnetic sensor for detecting a position of magnetic poles. For this reason, in order to control such a sensorless permanent magnet synchronous motor, a method is used in which a rotational speed (angular speed) of a rotor and a position of magnetic poles (angle) thereof are estimated by using a predetermined arithmetic expression such as an expression for d-q axis model based on, for example, a current flowing through windings or a voltage. In general, the position of magnetic poles is estimated by performing integration based on the rotational speed.

An estimated value of the rotational speed (estimated speed) is used to set a current command value for determining the magnitude of a current flowing through the windings. To be specific, setting is usually so made to increase the current command value when the estimated speed is smaller than a target speed and to reduce the current command value when the estimated speed exceeds the target speed, so that the estimated speed approaches the target speed. Concerning such setting, the following technology is described in Japanese Laid-open Patent Publication No. 2012-062909. According to the technology, when an estimated speed is not included in a predetermined speed limit range in a drive state where a d-axis current in the direction of magnetic flux is 0 (zero), a current command value of the q-axis current which causes torque for rotary drive is increased and decreased.

An estimated value of the position of magnetic poles (estimated angle) is generally used, for example, for coordinate transformation operation to generate a control signal to be given to the permanent magnet synchronous motor based on the set current command value. The estimated value of the position of magnetic poles (estimated angle) is used also for coordinate transformation operation to feedback, to a vector control, a measurement value of the current flowing through the windings.

As a technology for improving the accuracy of estimation of the position of magnetic poles, the following technology has been proposed (Japanese Laid-open Patent Publication No. 2015-133872). According to the technology, an actual value of a rotational speed is calculated based on a position detection signal Sa inputted by an actuator driven by a motor. The estimated angle is corrected based on a difference between the actual value and the estimated speed.

In controlling on a permanent magnet synchronous motor, the synchronization is sometimes lost, that is, a step-out sometimes occurs, in the conventional technologies. The step-out tends to occur, in particular, at the time of the start at which the rotation is accelerated.

When the rotation is accelerated, the rotational speed is increased from when the rotational speed is estimated to when the estimated value is reflected in the drive. Stated differently, estimating the rotational speed does not keep up with a change in rotational speed. The delay of the estimation of the rotational speed is accumulated in the estimation of the position of magnetic poles based on the estimated speed. For this reason, a large delay is caused easily in an estimated angle that is an estimated value of the position of magnetic poles.

The large delay in the estimated angle at the time of the start reduces torque with respect to the actual position of magnetic poles of the rotor. This reduces the rotational speed, leading to a high possibility of the occurrence of a step-out of the rotor.

As a method for making up for the reduction in torque, a method of increasing a current fed to the windings has been proposed. However, when the magnitude of the current is set at the upper limit of a settable range determined depending on the specifications of the driving circuit, further increasing the current is impossible. At the time of the start, in general, the magnitude of the current is set at a value close to the upper limit of the settable range; therefore further increasing the current is impossible. Even if the upper limit of the settable range is raised by changing components of a driving circuit, the manufacturing cost of the driving circuit increases.

The technology described in Japanese Laid-open Patent Publication No. 2015-133872 is directed to correct an estimated angle by obtaining, from a sensor external to the permanent magnet synchronous motor, a position detection signal Sa in accordance with an angular position of a rotor. In other words, while the permanent magnet synchronous motor is a sensorless motor, a controller thereof has a sensor for detecting a position of the rotor. This impairs the cost-saving effect provided by using the sensorless permanent magnet synchronous motor.

Another possible cause of a step-out is a difference between parameter values (motor constants) used in operation for estimating a rotational speed and a position of magnetic poles and the actual parameter values. The parameters are, for example, a resistance value of the windings, an inductance of the winding, and an induced voltage constant. When the temperatures of the windings and the permanent magnet change due to drive of the permanent magnet synchronous motor or due to change in ambient temperature, a difference is made between parameter values preset for estimation and the actual parameter values. This leads to incorrect estimation of the position of magnetic poles and the rotational speed.

To cope with the difference between the parameter values, a method has been proposed in which parameter values are measured at the time of start and the parameter values used for operation are updated. In such a method, however, it takes a long time for the start up and responsiveness to the start command is impaired.

SUMMARY

The present invention has been achieved in light of such a problem, and therefore, an object of an embodiment of the present invention is to provide a controller and a control method which are capable of preventing a step-out due to a difference between the actual position of magnetic poles and an estimated position thereof.

To achieve at least one of the abovementioned objects, according to an aspect of the present invention, a controller reflecting one aspect of the present invention is a controller for a permanent magnet synchronous motor having a rotor using a permanent magnet, the rotor rotating by a rotating magnetic field caused by a current flowing through an armature. The controller includes a drive portion configured to feed a current to the armature to drive the rotor; a speed estimating portion configured to estimate a rotational speed of the rotor based on the current flowing through the armature; a magnetic pole position estimating portion configured to estimate a position of magnetic poles of the rotor based on an estimated speed that is the rotational speed estimated; a control unit configured to control, based on an estimated angle that is an estimated value of the position of magnetic poles outputted by the magnetic pole position estimating portion, the drive portion to cause the rotating magnetic field rotating at a target speed indicated in an inputted speed command; a step-out presuming portion configured to presume, based on the target speed and the estimated speed, whether or not a step-out occurs; and a correction portion configured to correct the estimated angle when the step-out presuming portion presumes that a step-out occurs; wherein when the correction portion corrects the estimated angle, the control unit controls, based on a post-correction estimated angle that is the estimated angle corrected by the correction portion, the drive portion to cause the rotating magnetic field depending on the target speed.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

FIGS. 8A-6C are diagrams showing examples of a relationship between deviation of an estimated angle and driving torque.

FIG. 11 is a diagram showing an example of a table indicating thresholds depending on target speeds.

FIG. 13 is a diagram showing an example of a table indicating correction angles depending on speed ratios.

FIG. 14 is a diagram showing an example of a table indicating correction speeds depending on speed ratios.

DETAILED DESCRIPTION OF EMBODIMENTS

Hereinafter, one or more embodiments of the present invention will be described with reference to the drawings. However, the scope of the invention is not limited to the disclosed embodiments.

Figure 1:
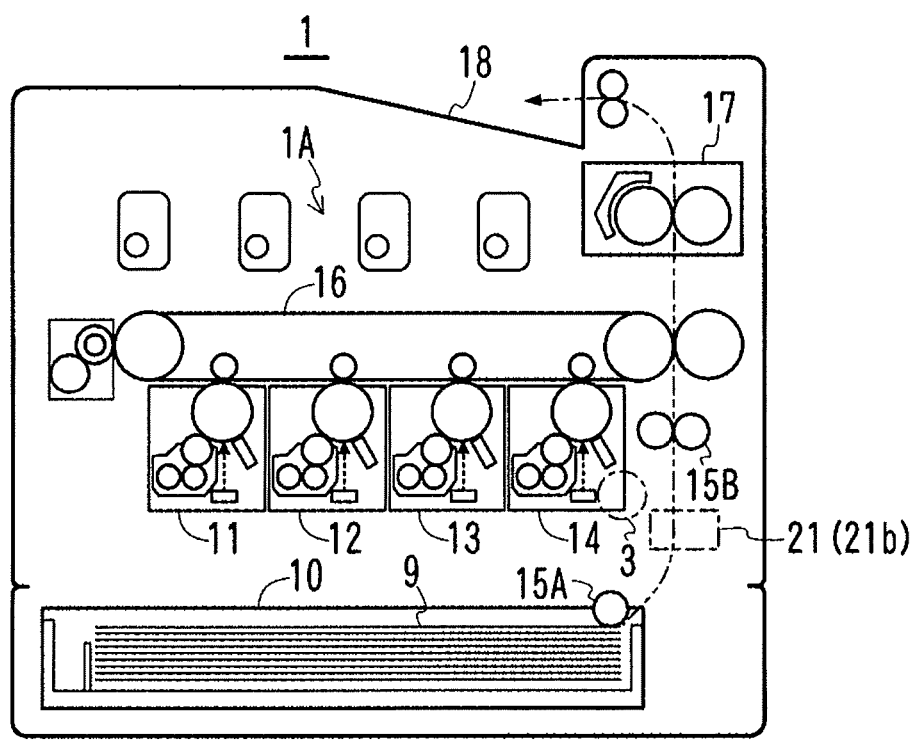
FIG. 1 is a diagram showing an outline of the structure of an image forming apparatus having a motor controller according to an embodiment of the present invention.
Figure 2:
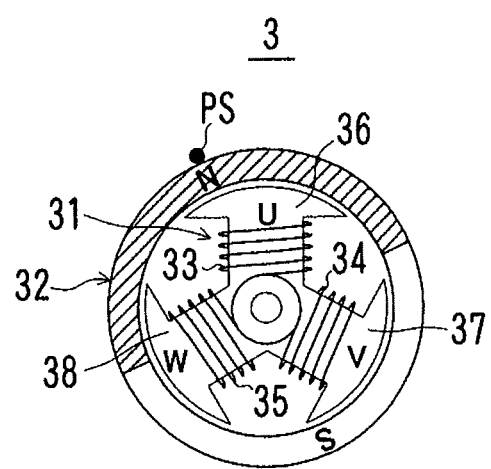
FIG. 2 is a diagram schematically showing an example of the structure of a brushless motor.

FIG. 1 shows an outline of the structure of an image forming apparatus 1 having a motor controller 21 according to an embodiment of the present invention. FIG. 2 schematically shows an example of the structure of a brushless motor 3.

Referring to FIG. 1, the image forming apparatus 1 is a color printer provided with an electrophotographic printer engine 1A. The printer engine 1A has four imaging stations 11, 12, 13, 14 to form, in parallel, a toner image of four colors of yellow (Y), magenta (M), cyan (C), and black (K). Each of the imaging stations 11, 12, 13, and 14 has a tubular photoconductor, an electrostatic charger, a developing unit, a cleaner, a light source for exposure, and so on.

The toner image of four colors is primarily transferred to the intermediate transfer belt 16, and then secondarily transferred onto paper 9 which has been sent out from a paper cassette 10 by a paper feed roller 15A, has passed through a registration roller pair 15B, and has been conveyed. After the secondary transfer, the paper 9 passes through a fixing unit 17 and then to be delivered to a paper output tray 18 which is provided in an upper part of the image forming apparatus 1. While the paper 9 passes through the fixing unit 17, the toner image is fixed onto the paper 9 by application of heat and pressure.

The image forming apparatus 1 uses a plurality of brushless motors including the brushless motor 3 as drive sources to rotate rotating members such as the fixing unit 17, the intermediate transfer belt 16, the paper feed roller 15A, the registration roller pair 15B, the photoconductor, and a roller for the developing unit. Stated differently, the printer engine 1A uses the rotating members of which rotation is driven by the brushless motors to feed the paper 9, then to form an image onto the paper 9.

The brushless motor 3 is disposed, for example, in the vicinity of the imaging station 14 to drive the rotation of the registration roller pair 15B. The brushless motor 3 is controlled by the motor controller 21 or a motor controller 21b.

Referring to FIG. 2, the brushless motor 3 is a sensorless Permanent Magnet Synchronous Motor (PMSM). The brushless motor 3 has a stator 31 acting as an armature for causing a rotating magnetic field and a rotor 32 using a permanent magnet. The stator 31 has a U-phase core 36, a V-phase core 37, and a W-phase core 38 that are located at 120°, by electrical angle, intervals from one another and three windings (coils) 33, 34, and 35 that are provided in the form of Y-connection. A 3-phase alternating current of U-phase, V-phase, and W-phase is fed to the windings 33-35 to excite the cores 36, 37, and 38 in turn, so that a rotating magnetic field is caused. The rotor 32 rotates in synchronism with the rotating magnetic field.

FIG. 2 shows an example in which the number of magnetic poles of the rotor 32 is two. However, the number of magnetic poles of the rotor 32 is not limited to two, may be four, six, or more than six. The rotor 32 may be an inner rotor or an outer rotor. The number of slots of the stator 31 is not limited to three. In any case, the motor controller 21, 21b performs, on the brushless motor 3, a vector control (sensorless vector control) for estimating a position of magnetic poles and a rotational speed by using a control model based on a d-q-axis coordinate system.

It is noted that, in the following description, of a south pole and a north pole of the rotor 32, a rotational angular position of the north pole shown by a filled circle is sometimes referred to as a "position of magnetic pole PS" of the rotor 32.

Figure 3:
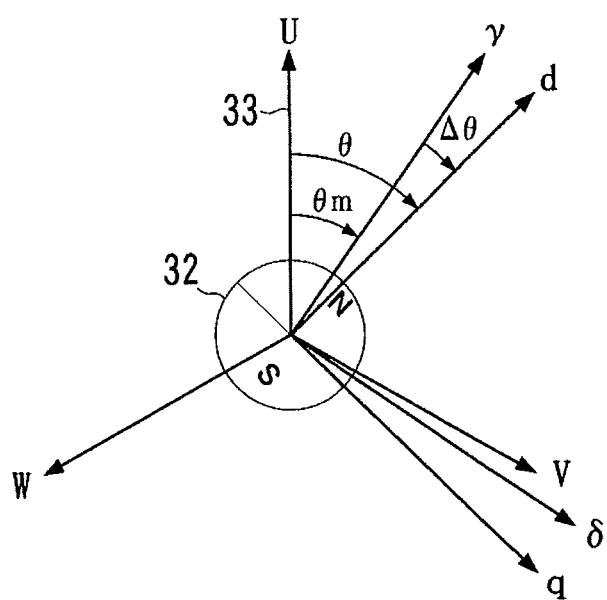
FIG. 3 is a diagram showing an example of a d-q axis model of a brushless motor.

FIG. 3 shows an example of a d-q-axis model of the brushless motor 3. The vector control on the brushless motor 3 is simplified by converting the 3-phase alternating current flowing through the windings 33-35 of the brushless motor 3 to a direct current fed to a 2-phase winding which rotates in synchronism with a permanent magnet acting as the rotor 32.

Let the direction of magnetic flux (direction of a north pole) of the permanent magnet be a d-axis (reactive current axis). Let the direction of movement from the d-axis by an electrical angle of $\pi/2$ [rad] (90°) be a q-axis (active current axis). The d-axis and the q-axis are model axes. The U-phase winding 33 is used as a reference and a movement angle of the d-axis with respect to the reference is defined as an angle $\theta$. The angle $\theta$ represents an angular position (position PS) of a magnetic pole with respect to the U-phase winding 33. The d-q-axis coordinate system is at a position moved, by angle $\theta$, from the reference, namely, the U-phase winding 33.

Since the brushless motor 3 is provided with no position sensor to detect an angular position (position of magnetic pole) of the rotor 32, the motor controller 21 needs to estimate a position PS of the magnetic poles of the rotor 32. A $\gamma$-axis is defined corresponding to an estimated angle $\theta m$ which represents the estimated position of the magnetic pole. A $\delta$-axis is defined as a position moved, by an electrical angle of $\pi/2$, from the $\gamma$-axis. The $\gamma$-$\delta$ axis coordinate system is positioned moved, by estimated angle $\theta m$, from the reference, namely, the U-phase winding 33. A delay of the estimated angle $\theta m$ with respect to the angle $\theta$ is defined as an angle $\Delta\theta$. When the amount of delay $\Delta\theta$ is 0 (zero), the $\gamma$-$\delta$ coordinate system coincides with the d-q coordinate system.

Figure 4:
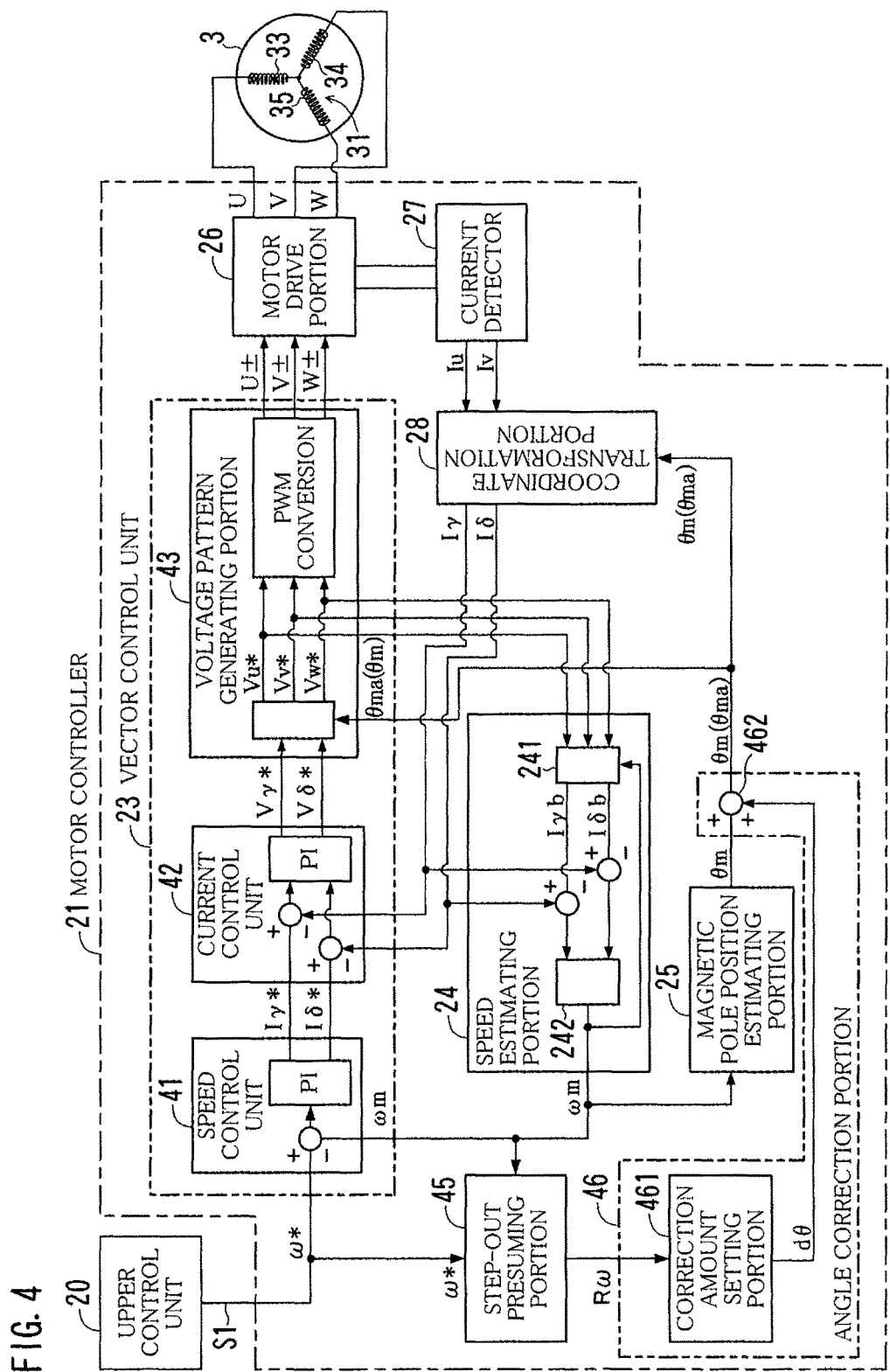
FIG. 4 is a diagram showing an example of the functional configuration of a motor controller.
Figure 5:
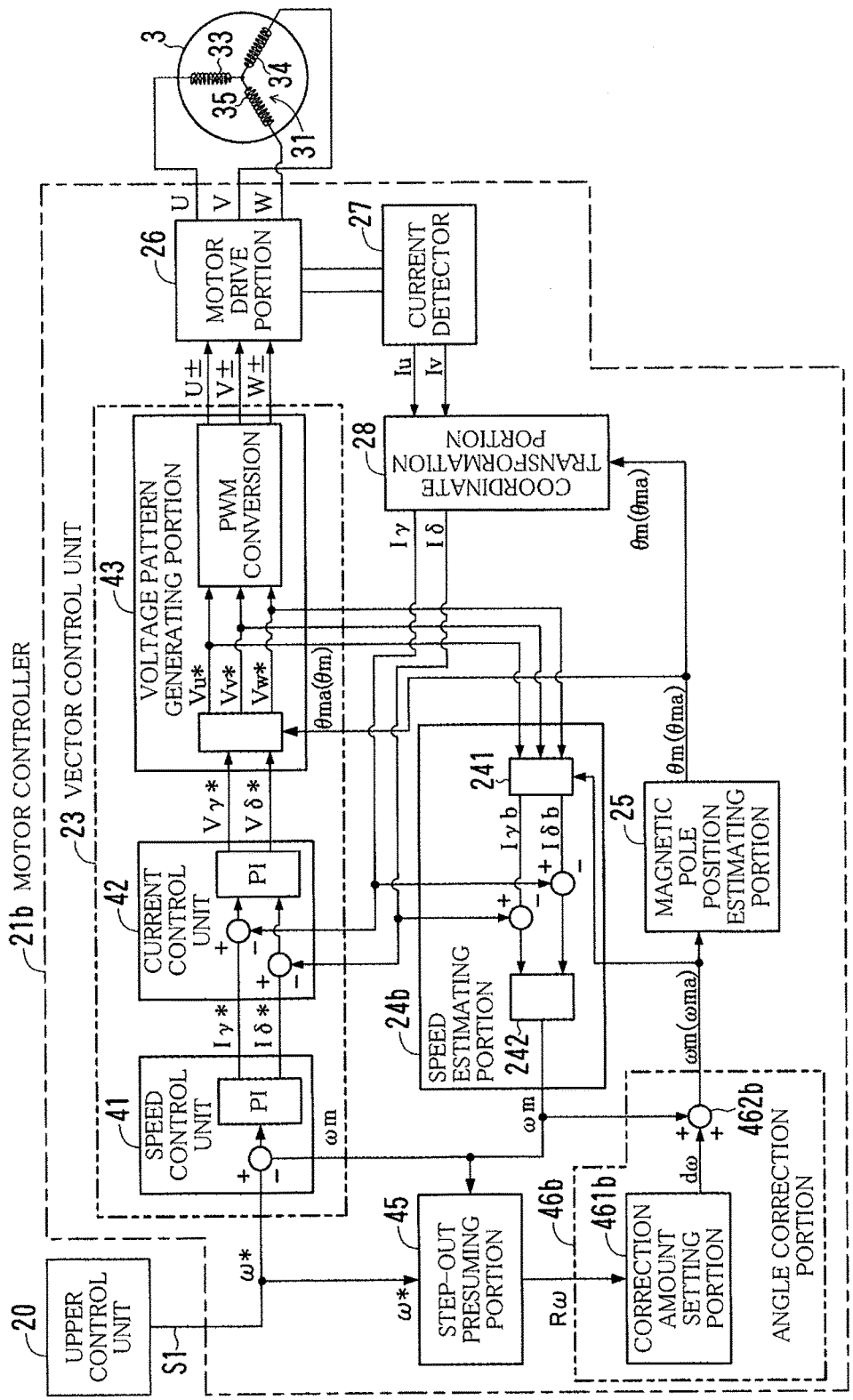
FIG. 5 is a diagram showing a modification of the functional configuration of a motor controller.
Figure 6:
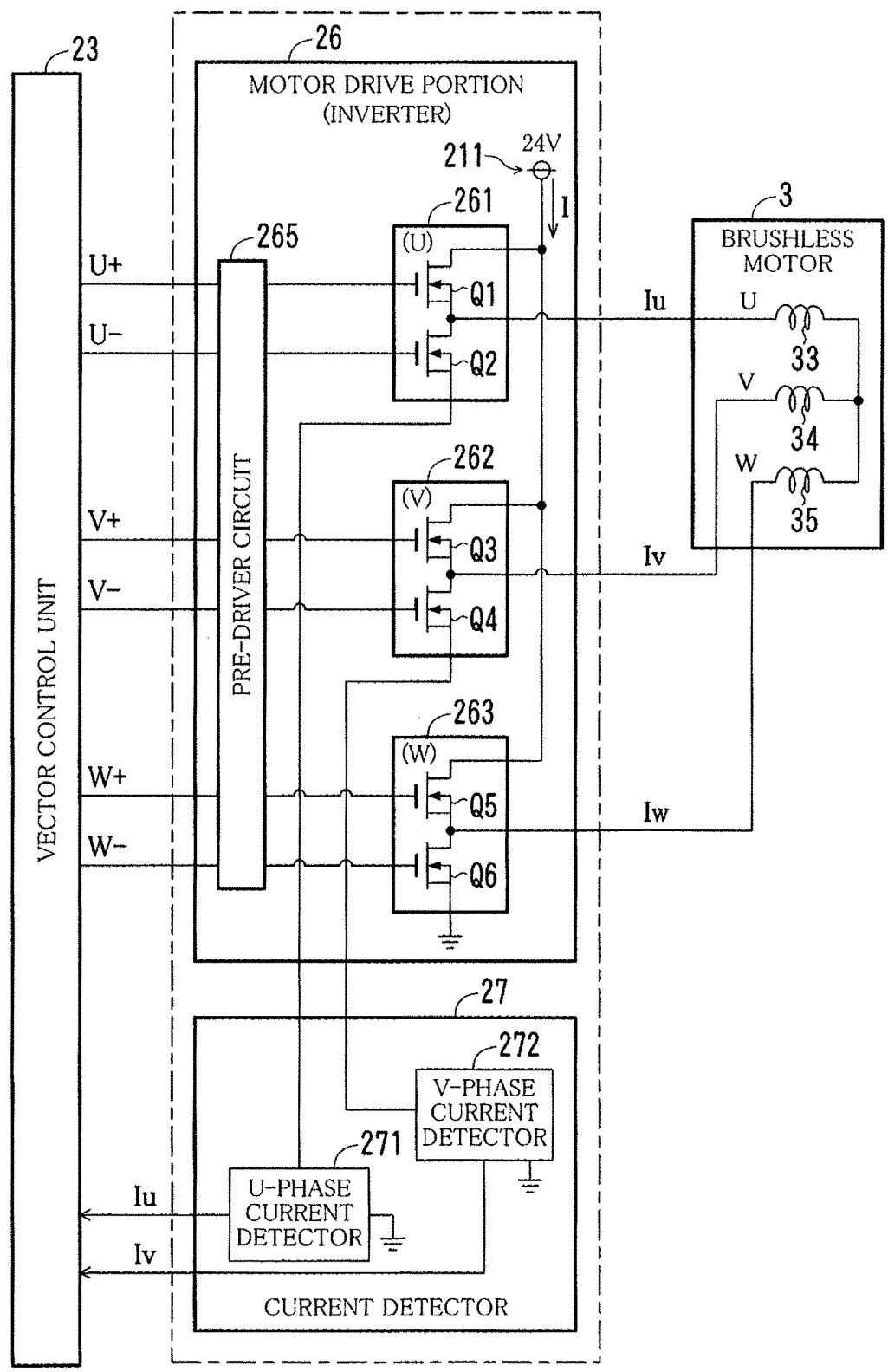
FIG. 6 is a diagram showing an example of the configuration of a motor drive portion and a current detector.

FIG. 4 shows an example of the functional configuration of the motor controller 21. FIG. 5 shows a modification of the functional configuration of the motor controller 21. FIG. 6 shows an example of the configuration of a motor drive portion 26 and a current detector 27 of the motor controller 21, 21b.

Referring to FIG. 4, the motor controller 21 includes the motor drive portion 26, the current detector 27, a vector control unit 23, a speed estimating portion 24, a magnetic pole position estimating portion 25, a coordinate transformation portion 28, a step-out presuming portion 45, and an angle correction portion 46. The step-out presuming portion 45 and the angle correction portion 46 pertain to processing for preventing a step-out at the time of acceleration.

The motor drive portion 26 is an inverter circuit for supplying a current to the windings 33-35 of the brushless motor 3 to drive the rotor 32. Referring to FIG. 5, the motor drive portion 26 includes three dual elements 261, 262, and 263, and a pre-driver circuit 265.

Each of the dual elements 261-263 is a circuit component that packages therein two transistors having common characteristics (Field Effect Transistor: FET, for example) connected in series.

The dual elements 261-263 control a current I flowing from a DC power line 211 through the windings 33-35 to a ground line. To be specific, transistors Q1 and Q2 of the dual element 261 control a current Iu flowing through the winding 33. Transistors Q3 and Q4 of the dual element 262 control a current Iv flowing through the winding 34. The transistors Q5 and Q6 of the dual element 263 control a current Iw flowing through the winding 35.

Referring to FIG. 6 the pre-driver circuit 265 converts control signals U+, U−, V+, V−, W+, and W− fed from the vector control unit 23 to voltage levels suitable for the transistors Q1-Q6. The control signals U+, U−, V+, V−, W+, and W− that have been subjected to the conversion are given to control terminals (gates) of the transistors Q1-Q6.

The current detector 27 includes a U-phase current detector 271 and a V-phase current detector 272 to detect currents Iu and Iv flowing through the windings 33 and 34, respectively. Since the relationship of Iu+Iv+Iw=0 is satisfied, the current Iw can be obtained from the calculation of the values of the currents Iu and Iv detected. It is also possible to provide a W-phase current detector.

The U-phase current detector 271 and the V-phase current detector 272 amplify a voltage drop by a shunt resistor having a small value (1/10Ω order) of resistance provided in the current path of the currents Iu and Iv to perform A/D conversion on the resultant, and output the resultant as detection values of the currents Iu and Iv. In short, a two-shunt detection is made.

The motor controller 21 may be configured by using a circuit component in which the motor drive portion 26 and the current detector 27 are integral with each other.

Referring back to FIG. 4, the vector control unit 23 controls the motor drive portion 26 in accordance with a target speed (speed command value) $\omega^*$ indicated in a speed command S1 given by a upper control unit 20. The upper control unit 20 is a controller to control an overall operation of the image forming apparatus 1. The upper control unit 20 gives the speed command S1 when: the image forming apparatus 1 warms up; the image forming apparatus 1 executes a print job; the image forming apparatus 1 turns into a power-saving mode; and so on.

In giving a command to start driving the rotation, the upper control unit 20 sends the speed command S1 including a start command to the vector control unit 23. After that, the upper control unit 20 increases a target speed $\omega^*$ indicated in the speed command S1 to accelerate in accordance with the operation pattern described later. Instead of this, however, the upper control unit 20 may give the start command and a final target speed to the vector control unit 23 so that the vector control unit 23 generates the target speed ω* for acceleration in accordance with the operation pattern.

The vector control unit 23 controls the motor drive portion 26 based on an estimated angle θm which is an estimated value of a position PS of magnetic poles outputted from the magnetic pole position estimating portion 25, or, alternatively, based on a post-correction estimated angle θma obtained by correcting the estimated angle θm so that a rotating magnetic field rotating at the target speed ω* indicated in the speed command S1 is generated.

The vector control unit 23 includes a speed control unit 41, a current control unit 42, and a voltage pattern generating portion 43.

The speed control unit 41 performs operation for a Proportional-Integral control (PI control) of making the difference between the target speed ω* given by the upper control unit 20 and an estimated speed ωm given by the speed estimating portion 24 close to 0 (zero) to determine current command values Iγ* and Iδ* in the γ-δ coordinate system. The estimated speed ωm is inputted at constant intervals. Every time the estimated speed ωm is inputted, the speed control unit 41 determines the current command values Iγ* and Iδ* depending on the target speed ω* at that time.

The current control unit 42 performs operation for a proportional-integral control of making the difference between the current command values Iγ* and Iδ* and the estimated current values Iγ and Iδ* sent from the coordinate transformation portion 2B to 0 (zero) to determine voltage command values Vγ* and Vδ* in the γ-δ coordinate system.

The voltage pattern generating portion 43 converts the voltage command values Vγ* and Vδ* to a U-phase voltage command value Vu*, a V-phase voltage command value Vv*, and a W-phase voltage command value Vw* based on the estimated angle θm or the post-correction estimated angle θma inputted from the angle correction portion 46. The voltage pattern generating portion 43 then generates patterns of control signals U+, U−, V+, V−, W+, and W− based on the voltage command values Vu*, Vv*, and Vw*, then outputs the same to the motor drive portion 26.

The speed estimating portion 24 includes a first operation portion 241 and a second operation portion 242. The speed estimating portion 24 estimates a rotational speed of the rotor 32 based on the currents Iu, Iv, and Iw flowing through the windings 33-35 of the rotor 32.

The first operation portion 241 calculates current values Iγb and Iδb in the γ-δ coordinate system based on the voltage command values Vu*, Vv*, and Vw* determined by the voltage pattern generating portion 43. As a modification thereof, the first operation portion 241 may calculate the current values Iγb and Iδb based on the voltage command values Vγ* and Vδ* determined by the current control unit 42. In either case, the first operation portion 241 uses the estimated speed ωm obtained in the previous estimation by the second operation portion 242 to calculate the current command values Iγb and Iδb.

The second operation portion 242 determines an estimated speed (estimated speed value) ωm in accordance with a so-called voltage current equation based on the difference between estimated current values Iγ and Iδ sent from the coordinate transformation portion 28 and the current values Iγb and Iδb by the first operation portion 241. The estimated speed ωm is an example of an estimated value of the rotational speed ω of the rotor 32. The estimated speed ωm is given to the speed control unit 41, the magnetic pole position estimating portion 25, and the step-out presuming portion 45.

The magnetic pole position estimating portion 25 estimates a position PS of magnetic poles of the rotor 32 based on the estimated speed ωm. To be specific, the estimated speed ωm is integrated to calculate the estimated angle θm as the estimated value of the position PS of magnetic poles.

The coordinate transformation portion 28 calculates a value of the W-phase current Iw based on the values of the U-phase current Iu and the V-phase current Iv detected by the current detector 27. The coordinate transformation portion 28 then calculates the estimated current values Iγ and Iδ in the γ-δ coordinate system based on the estimated angle θm or the post-correction estimated angle θma and the three phase currents Iu, Iv, and Iw. In short, the coordinate transformation portion 28 transforms the three phase currents to the two phase currents.

The step-out presuming portion 45 presumes, based on the target speed ω* and the estimated speed ωm, whether or not a step-out (loss of synchronization) occurs. The method for presumption is detailed later.

The angle correction portion 46 includes a correction amount setting portion 461 and an adder 462. When the step-out presuming portion 45 presumes that a step-out occurs, the angle correction portion 46 corrects the estimated angle θm outputted by the magnetic pole position estimating portion 25 to the post-correction estimated angle θma. In contrast, when the step-out presuming portion 45 presumes that a step-out does not occur, the angle correction portion 46 does not correct the estimated angle θm.

In the angle correction portion 46, the adder 462 adds a correction angle dθ set by the correction amount setting portion 461 to the estimated angle θm, so that the angle correction portion 46 outputs the post-correction estimated angle θma. When the correction angle dθ has a value of "0 (zero)", the adder 462 outputs the estimated angle θm as-is.

The motor controller 21b shown in FIG. 5 includes an angle correction portion 46b and a speed estimating portion 24b instead of the angle correction portion 46 and the speed estimating portion 24 of the motor controller 21 shown in FIG. 4. Except for this respect, the configuration of the motor controller 21b is the same as that of the motor controller 21.

When the step-out presuming portion 45 presumes the occurrence of a step-out, the angle correction portion 46b of FIG. 5 corrects the estimated speed ωm which is fed from the speed estimating portion 24b to the magnetic pole position estimating portion 25 to a post-correction estimated speed ωma so that the magnetic pole position estimating portion 25 outputs the post-correction estimated angle θma as the estimated angle θm. When the correction speed dω has a value of 0 (zero), an adder 462b outputs the estimated speed ωm thus fed as-is.

The angle correction portion 46b includes a correction amount setting portion 461b and the adder 462b. The adder 462b adds a correction speed dω set by the correction amount setting portion 461b to the estimated speed ωm. The angle correction portion 46b calculates the post-correction estimated speed θma to give the same to the magnetic pole position estimating portion 25.

As with the speed estimating portion 24 of FIG. 4, the speed estimating portion 24b includes the first operation portion 241 and the second operation portion 242. With the speed estimating portion 24b, the first operation portion 241 receives an input of the estimated speed θma or the post-correction estimated speed θma outputted by the angle correction portion 46b.

In the meantime, each of the motor controllers 21 and 21b of this embodiment has a function to prevent a step-out due to a difference between an actual angle θ at the position of magnetic poles and the estimated angle θm. The description goes on further to the configuration and operation of the motor controllers 21 and 21b, focusing on the function thereof.

Figure 7:
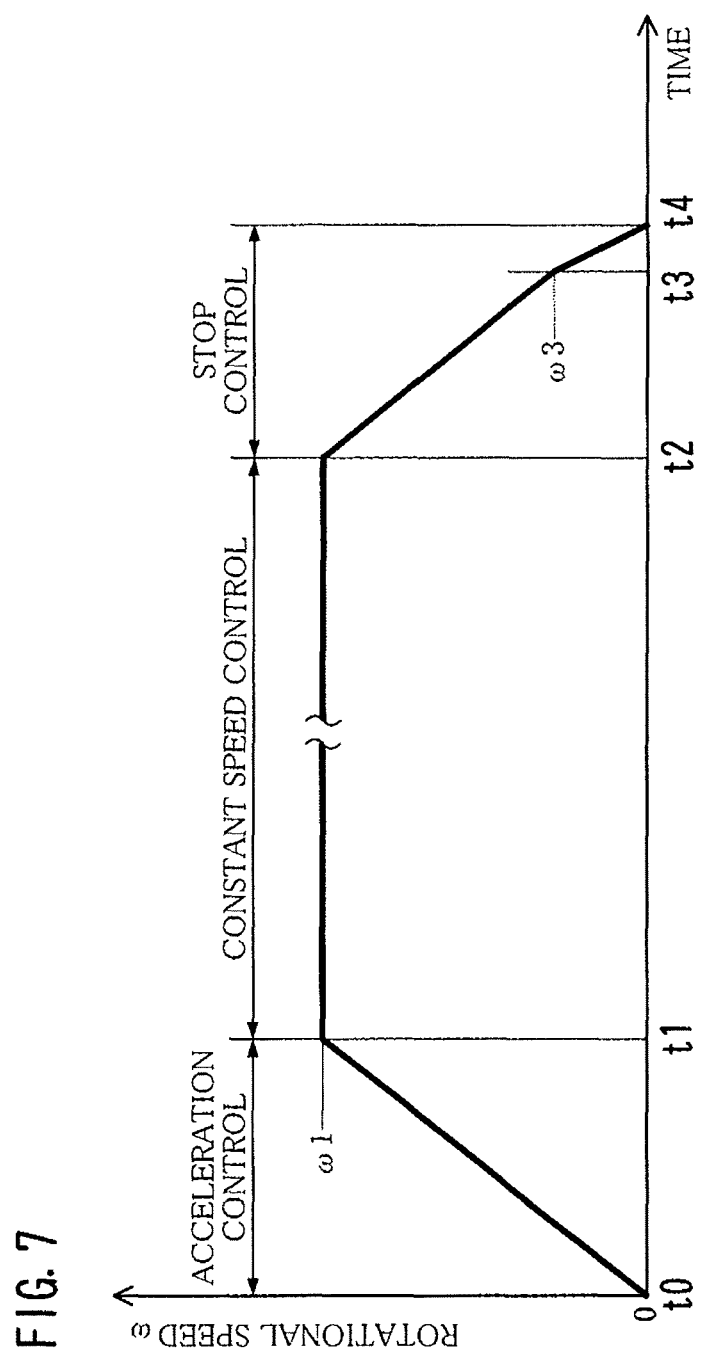
FIG. 7 is a diagram showing an example of an operation pattern of a brushless motor.

FIG. 7 shows an example of an operation pattern of the brushless motor 3. At a time t0, a start command is given to the motor controller 21, 21b. The start command is the speed command S1 to instruct acceleration to a final target speed ω1. Suppose that the brushless motor 3 is in a stop state before the time t0.

During a period from the time t0 to the time t1, an acceleration control is performed to increase the rotational speed ω from 0 (zero) to the final target speed ω1. At this time, the target speed (speed command value) ω* indicated in the speed command S1 is updated momently, for example, so as to be increased at a constant rate.

When the rotational speed ω reaches the final target speed ω1, a constant speed control is performed for keeping the rotational speed ω at the final target speed ω1. The target speed ω* at this time is the final target speed ω1. When a stop command is given at a time t2, a stop control is performed for stopping the rotor 32. For example, the vector control is made to reduce the rotational speed ω. Then, at a time t3 at which the rotational speed ω is reduced to a lower limit speed ω3 at which the position PS of magnetic poles can be estimated, the control is switched to fixed excitation for drawing the position PS of magnetic poles to a stop position. The rotor 32 is then stopped before or at a time t4.

Figure 8A:
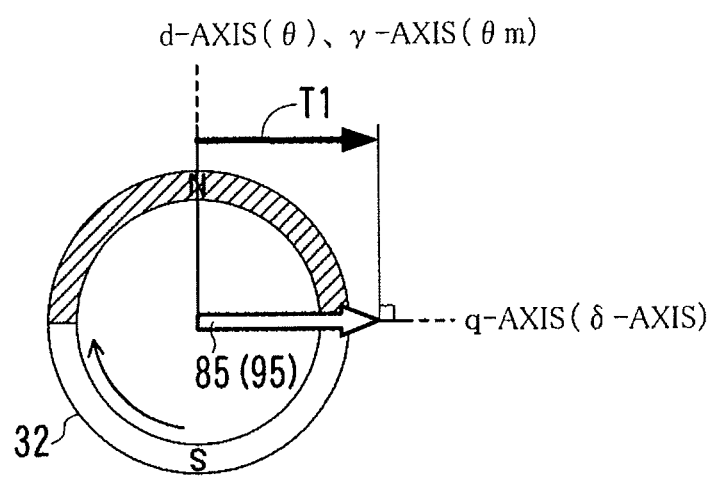
Figure 8B:
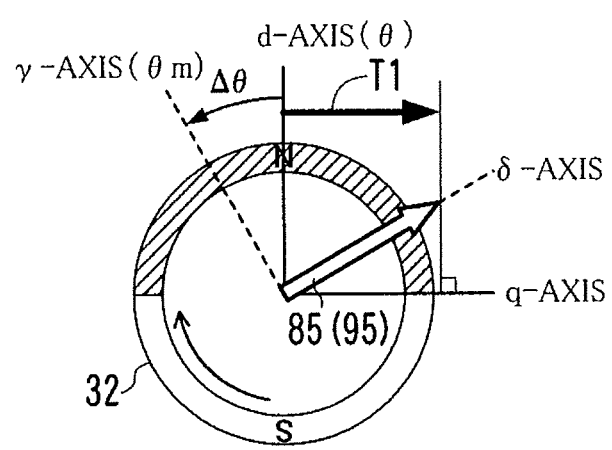
Figure 8C:
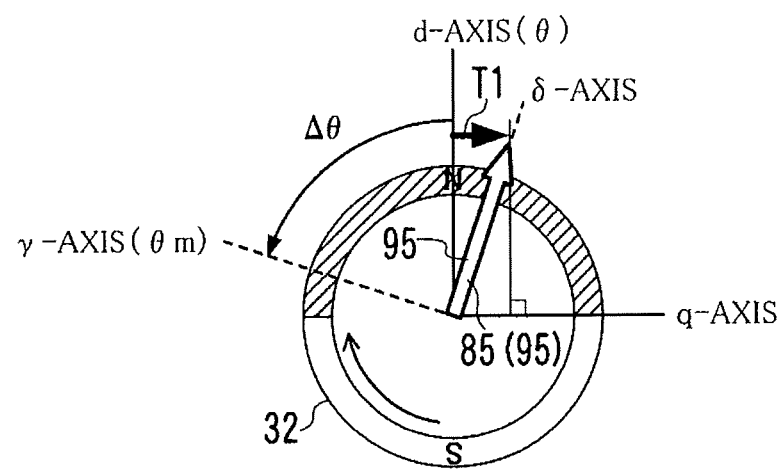

FIGS. 8A-8C show examples of a relationship between an amount of delay Δθ of the estimated angle θm and driving torque T1.

In the acceleration control for greatly increasing the rotational speed ω, e.g., at the start time, as shown in FIGS. 8A-8C, a magnetic field vector 85 having a δ-axis direction determined based on the estimated angle θm or a direction close thereto is set. Setting the magnetic field vector 85 corresponds to setting the current vector 95 of which a direction is the same as that of the magnetic field vector 85. The current vector 95 represents a current to be fed to the windings 33-35 in order to generate a magnetic field which rotates the rotor 32. The magnitude of the current vector 95 is proportional to the magnitude of the magnetic field vector 85. For simplification of the drawings, the magnetic field vector 85 and the current vector 95 are shown as the vectors having the same magnitude as each other as shown in FIGS. 8A-8C.

Setting the current vector 95 corresponds to, in practical processing to control the motor drive portion 26, setting the direction and magnitude of the current vector 95. As the direction of the current vector 95, a direction moved, by an electrical angle of π/2, from the estimated angle θm, namely the δ-axis direction, is set. As the magnitude of the current vector 95, a γ-axis component (current command value Iγ*) and a δ-axis component (current command value Iδ*) of the current vector 95 are set. At this time, the current command values Iγ* and Iδ* are so set that the current I flowing through the brushless motor 3 has a value corresponding to the upper limit or a slightly smaller than the upper limit of settable range depending on the specifications of the motor drive portion 26. Where the direction of the current vector 95 is set at the δ-axis direction as shown in FIGS. 8A-8C, the current command value Iγ* is 0 (zero).

As shown in FIG. 8A, where the estimated angle θm is equal to an angle θ corresponding to the actual position PS of magnetic poles, the largest driving torque T1 which is the largest driving torque among driving torque generatable by the current vector 95 acts on the rotor 32.

As shown in FIGS. 8B and 8C, as the amount of delay Δθ between the estimated angle θm and the angle θ is increased within a range of 0 (zero) to π/2, the driving torque T1 is reduced. When the amount of delay Δθ reaches π/2, the driving torque T1 becomes 0 (zero). In such a case, a step-out occurs most probably.

At the time of acceleration, the rotational speed ω is increased from when the rotational speed ω is estimated to when the estimated speed ωm is reflected in the drive. This delays estimating the rotational speed ω with respect to the change in rotational speed ω. The delay in estimation of the rotational speed ω is accumulated in calculation of the estimated angle θm based on the estimated speed ωm. Thus, the amount of delay Δθ tends to be increased at the time of acceleration as compared to the time of the constant speed control.

The reduction in the driving torque T1 lowers the rotational speed ω. As discussed earlier, in the vector control, the current command values Iγ* and Iδ* are so determined as to make the difference between the target speed ω* and the estimated speed ωm small. However, if the rotational speed ω drops greatly, the reduction in the rotational speed ω cannot be suppressed even if the settings of the current command values Iγ* and Iδ* are changed. This increases the possibility of occurrence of a step-out.

To address this, the motor controller 21, 21b corrects the estimated angle θm when it is presumed, based on the target speed ω* and the estimated speed ωm, that a step-out occurs.

Figure 9A:
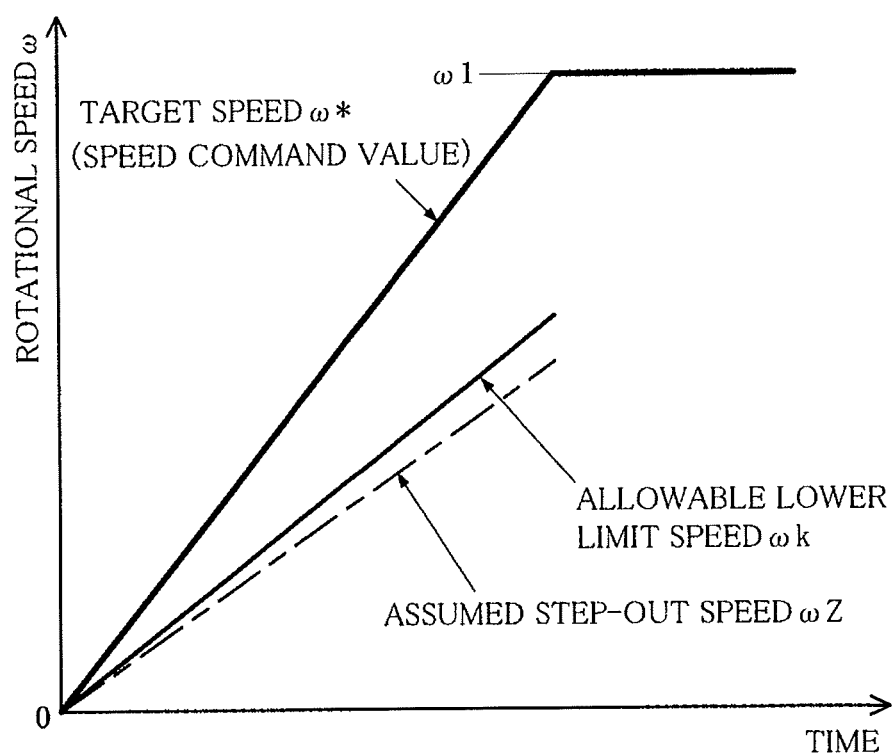
FIGS. 9A and 9B are diagrams showing examples as to how to set a threshold used to presume a step-out.
Figure 9B:
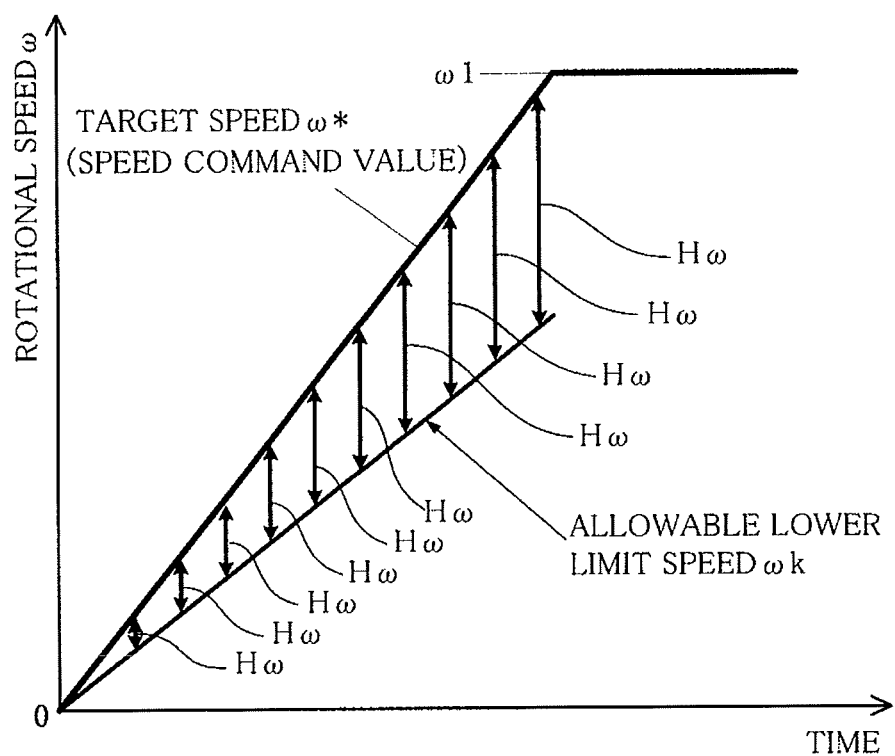
Figure 10:
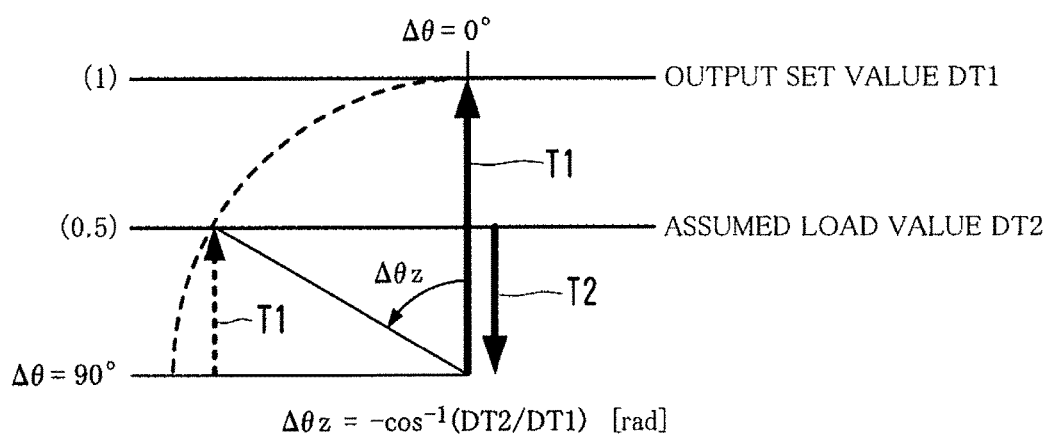
FIG. 10 is a diagram showing an example as to how to set the upper limit of an amount of delay of an estimated angle.

FIGS. 9A and 9B show examples as to how to set a threshold Hω used to presume a step-out. FIG. 10 shows an example as to how to set the upper limit Δθz of the amount of delay Δθ of the estimated angle θm. FIG. 11 shows an example of a table 71 showing thresholds Hω depending on target speeds ω*.

Referring to FIG. 9A, an assumed step-out speed ωZ and an allowable lower limit speed ωk are set for the time of acceleration at which the target speed ω* is increased.

The assumed step-out speed ωz is a rotational speed ω at which it is considered that a certain amount of delay Δθ is seen. The amount of delay Δθ causes rotational driving force acting on the rotor 32 to become 0 (zero) at the time of acceleration. The state where the rotational driving force turns to become 0 (zero) means that the absolute value of the magnitude of the driving torque T1 is equal to the absolute value of the magnitude of the load torque T2 which acts to suppress the rotation as shown in FIG. 10. The load torque T2 is involved with a resistance load and an inertial load. Suppose that the absolute value (output set value) of the magnitude of the driving torque T1 is denoted by DT1 and the absolute value (assumed load value) of the magnitude of the load torque T2 is denoted by DT2. In such a case, a limit amount of delay Δθz which is an amount of delay Δθ for the case of DT1=DT2 is expressed in the following Equation (1).

$$\Delta\theta z = \arccos(DT2/DT1)[\text{rad}] \quad (1)$$

The output set value DT1 is an example of a current set value for determining a value of the current flowing through the stator 31 as an armature.

A limit speed ratio Rωz that is a ratio of a rotational speed ωz for the case of using Δθz as the Δθ to a rotational speed ωx for the case of 360° rotation (2π[rad]) with Δθ remaining "0" (zero) is expressed in the following Equation (2).

$$R\omega z = \omega z/\omega x = (2\pi + \Delta\theta z)/2\pi \quad (2)$$

The assumed step-out speed ωZ is expressed, by using the limit speed ratio Rωz and the target speed ω* in the following Equation (3).

$$\omega Z = \omega^* \cdot R\omega z \quad (3)$$

For example, where the output set value DT1 is set at "1" and the assumed load value DT2 is set at "0.5", the following relationship is established based on Equation (1).

$$\Delta\theta z = -\arccos(0.5/1) = -1.0472 [\text{rad}] \text{ (approximately } -60°\text{)}$$

The limit speed ratio Rωz is obtained by using Equation (2).

$$R\omega z = (2\pi - -1.0472)/2\pi = 0.838$$

Suppose that the target speed ω* at a point in time during the acceleration is "500", for example. In such a case, the assumed step-out speed ωZ is obtained by using Equation (3).

$$\omega Z = 500 \times 0.838 = 419$$

The allowable lower limit speed ωk shown in FIG. 9A is a value obtained by adding an allowance value (margin) to the assumed step-out speed ωZ. The allowable lower limit speed ωk is set in order to presume that a step-out occurs before the step-out occurs actually. Since the assumed step-out speed ωZ is calculated based on the assumed load value DT2, the allowable lower limit speed ωk is supposed to be set depending on the load of the brushless motor 3.

For example, the assumed load value DT2 is set to be relatively large to set the allowance value. For each value applicable as the target speed ω*, a value which is approximately 5-15% larger than the assumed step-out speed ωZ is gettable as the allowable lower limit speed ωk.

As shown in FIG. 9B, a difference between the target speed ω* and the allowable lower limit speed ωk at each point in time at the time of acceleration is set as the threshold Hω. Then, as shown in FIG. 11, the target speeds ω* and the thresholds Hω are stored so as to correspond to each other in the table 71.

Figure 12A:
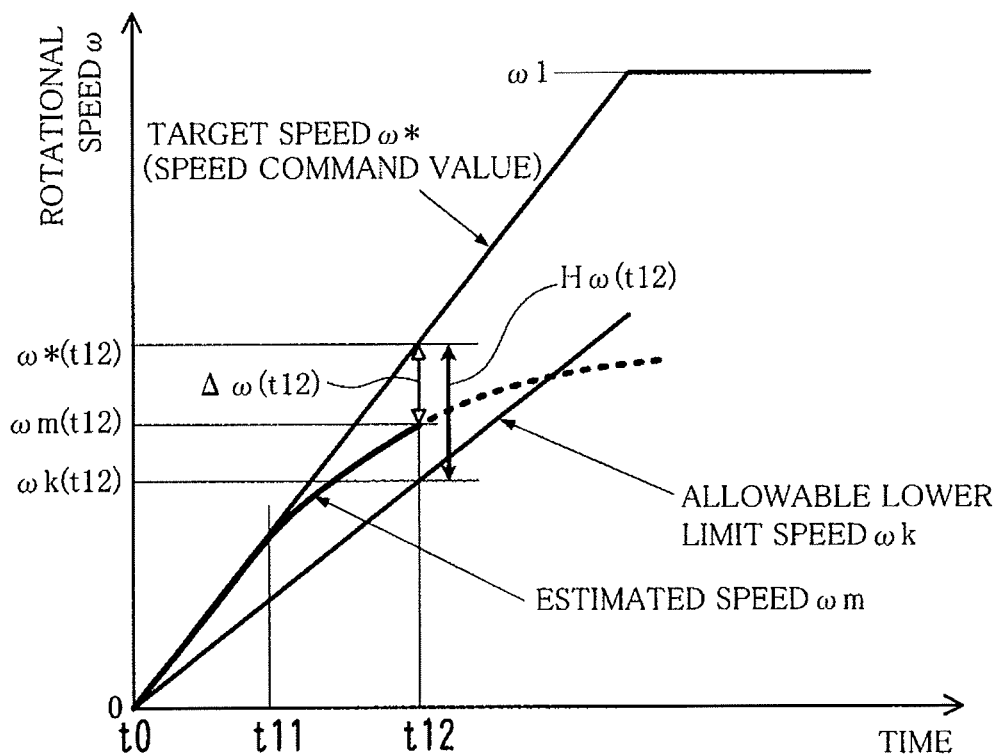
FIGS. 12A and 12B are diagrams showing examples of the transition of an estimated angle.
Figure 12B:
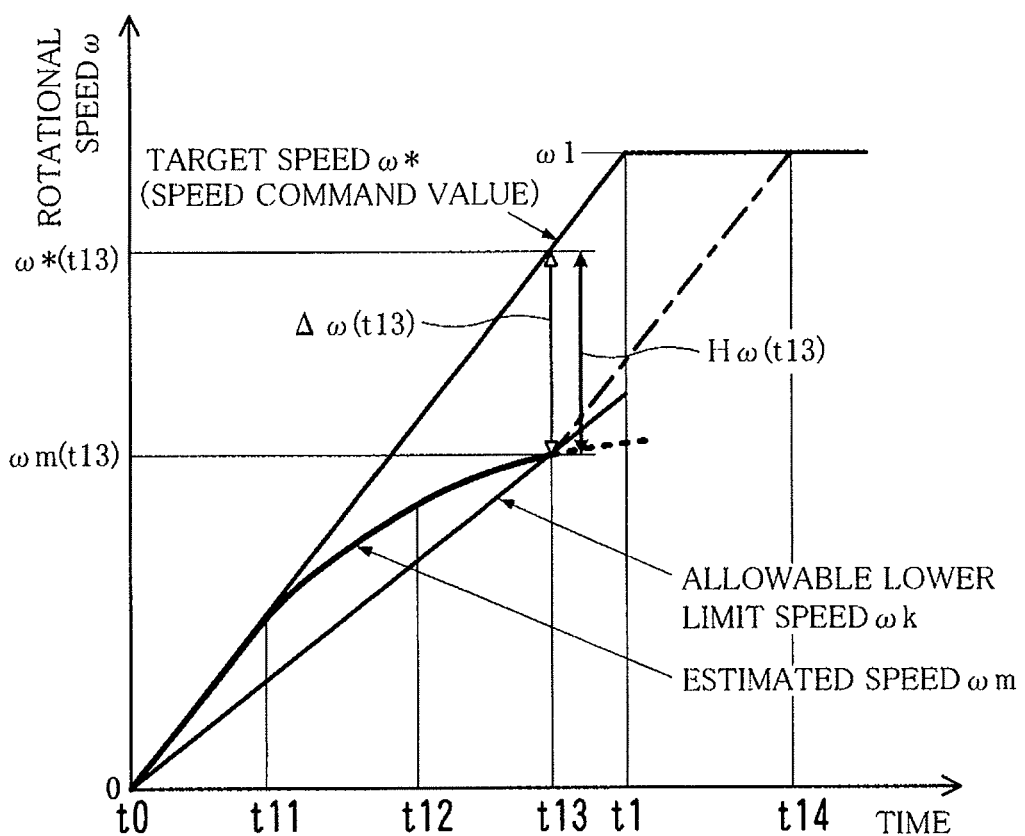

FIGS. 12A and 12B show examples of the transition of the estimated angle ωm. FIG. 13 shows an example of a table 72 indicating correction angle dθ depending on the speed ratios Rω. FIG. 14 shows an example of a table 72b indicating correction speeds dω depending on the speed ratios Rω.

Referring also to FIGS. 4 and 5, when receiving an input of the latest estimated speed ωm, the step-out presuming portion 45 reads out a threshold Hω corresponding to a target speed ω* at that time from the table 71. The step-out presuming portion 45 then calculates a speed difference Δω which is a difference between the target speed ω* and the estimated speed ωm. If the speed difference Δω is greater than the threshold Hω, then the step-out presuming portion 45 presumes that a step-out occurs. The presumption corresponds to the presumption that a step-out occurs when the estimated speed ωm is smaller than the allowable lower limit speed ωk. The details thereof are provided below.

Referring to FIG. 12A, the acceleration starts at the time t0. From the time t0 to a time t11, the estimated speed ωm follows the increase in target speed ω*. At the time t11 and beyond, the estimated speed ωm starts to be smaller than the target speed ω*.

At a time t12 posterior to the time t11, the speed difference Δω (t12) is observed between the target speed ω* (t12) and the estimated speed ωm (t12). The speed difference Δω(t12) is smaller than the threshold Hω (t12) corresponding to the target speed ω* (t12). The step-out presuming portion 45 thus presumes that a step-out does not occur. In such a case, the correction by the angle correction portion 46, 46b is not performed.

Referring to FIG. 12B, at a time t13 posterior to the time t12, the speed difference Δω (t13) between the target speed ω* (t13) and the estimated speed ωm (t13) is observed. The speed difference Δω (t13) is greater than the threshold Hω (t13) corresponding to the target speed ω* (t13). The step-out presuming portion 45 thus presumes that a step-out occurs.

In response to the presumption that a step-out occurs, the angle correction portion 46, 46b corrects the estimated angle θm. The angle correction portion 46, 46b receives a correction command and a speed ratio Rω from the step-out presuming portion 45.

The speed ratio Rω is a ratio of the estimated speed ωm to the target speed ω*. The speed ratio Rω is expressed in the following Equation (4).

$$R\omega = \omega m / \omega^* \quad (4)$$

The correction amount setting portion 461 of the angle correction portion 46 shown in FIG. 4 reads out, from the table 72 shown in FIG. 13, a correction angle dθ corresponding to the speed ratio Rω inputted to send the correction angle dθ to the adder 462. The adder 462 outputs, as the post-correction estimated angle θma, the sum of the estimated angle θm and the correction angle dθ.

The table 72 is created in advance. The table 72 is stored in a nonvolatile memory accessible by the correction amount setting portion 461. In the table 72, a correction angle dθ is made correspond to each value of possible speed ratios Rω.

The correction angle dθ is a correction amount corresponding to the delay Δθ of the estimated angle θm. The correction angle dθ is expressed in the following equation (5) by using the speed ratio Rω.

$$d\theta = 2\pi - (2\pi \cdot R\omega)[\text{rad}] \quad (5)$$

Suppose that, for example, the target speed ω* is "1000" and the estimated speed ωm is "900". In such a case, the speed ratio Rω is: Rω=900/1000=0.90 based on the Equation (4). The correction angle dθ is: dθ=2π−(2π−(2π·0.90)=0.6283 [rad]≈36.0° based on Equation (5).

The estimated angle θm is corrected to be the actual angle θ of the magnetic pole or a value close thereto by adding the correction angle dθ. Stated differently, the estimated angle θm is corrected to the post-correction estimated angle θma. The correction changes the driving torque T1 by the current vector 95 to be greater than that before the correction (see FIG. 8A). Thus, the actual rotational speed ω is increased. Along with this, the estimated speed ωm is increased as shown by the dot-dash line of FIG. 12B. Referring to FIG. 12B, the estimated speed θm reaches the final target speed ω1 at a time t14 later than the time t1 supposed in the operational pattern.

If the table 72 has no values of speed ratio Rω equal to the value of the speed ratio Rω inputted from the step-out presuming portion 45, among the values of the speed ratio Rω shown in the table 72, a correction angle dθ is preferably read out which is made correspond to a value closest to the value of the speed ratio Rω inputted. It is also possible to calculate the correction angle dθ by performing the operation of Equation (5) or interpolation operation based on values close to the value of the speed ratio Rω inputted.

The correction amount setting portion 461b of the angle correction portion 46b shown in FIG. 5 reads out, from the table 72b shown in FIG. 14, a correction speed dω corresponding to the speed ratio Rω inputted to send the correction angle the to the adder 462*b*. The adder 462*b* outputs, as the post-correction estimated angle ωma, the sum of the estimated speed ωm and the correction speed dω.

As described above, the magnetic pole position estimating portion 25 outputs the post-correction estimated angle θma. To be specific, the angle correction portion 46*b* performs, as the processing for correcting the estimated angle θm, processing corresponding to operation of adding, to the estimated angle θm, the correction angle dθ corresponding to the ratio Rω of the estimated speed θm to the target speed ω*.

The table 72*b* is created in advance. The table 72*b* is stored in a nonvolatile memory accessible by the correction amount setting portion 461*b*. In the table 72*b*, a correction speed dω is made correspond to each value of possible speed ratios Rω. The value of the correction speed dω is so set to correspond to the correction angle dθ.

Figure 15:
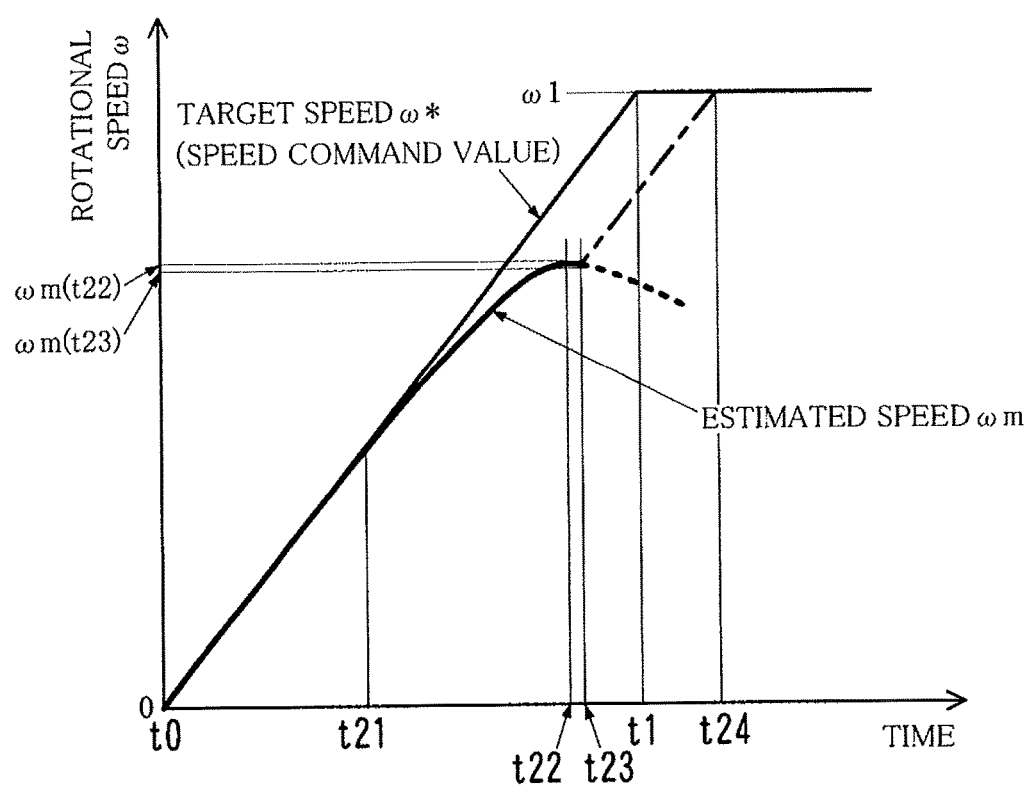
FIG. 15 is a diagram showing another example of the transition of an estimated angle.

The description goes on to another example of a method for presumption by the step-out presuming portion 45. FIG. 15 shows another example of the transition of the estimated angle θm.

The step-out presuming portion 45 presumes that a step-out occurs when the estimated speed θm is reduced in a state where the motor drive portion 26 is so controlled that the current I flowing through the windings 33-35 of the stator 31 reaches the upper limit within a settable range, for example, in a state where the acceleration control is made. The settable range is determined depending on the specifications of the motor drive portion 26.

Referring to FIG. 15, at a time t21 and beyond, the estimated speed ωm starts to become smaller than the target speed ω*. The estimated speed ωm, however, increases before a time t22. At a time t23 posterior to the time t22, the estimated speed ωm (t23) is smaller than the estimated speed ωm (t22) at the time t22.

Every time the latest estimated speed ωm is inputted, the step-out presuming portion 45 compares between the latest estimated speed ωm and the estimated speed ωm inputted previously. If the comparison result repeatedly shows that the latest estimated speed ωm is smaller than the previous estimated speed ωm, for example, a predetermined number of times or more, or, alternatively, if the latest estimated speed ωm is smaller than the largest value of the previous estimated speeds ωm and a difference therebetween is equal to or greater than the threshold, then the step-out presuming portion 45 presumes that a step-out occurs.

In the illustrated example of FIG. 15, at the time t23, the occurrence of a step-out is presumed, and the angle correction portion 46*b* corrects the estimated angle θm. The correction on the estimated angle θm changes from the reduction in estimated speed ωm to the increase in estimated speed ωm as shown by the dot dash line. At a time t24, the estimated speed ωm reaches the final target speed ω1.

Figure 16:
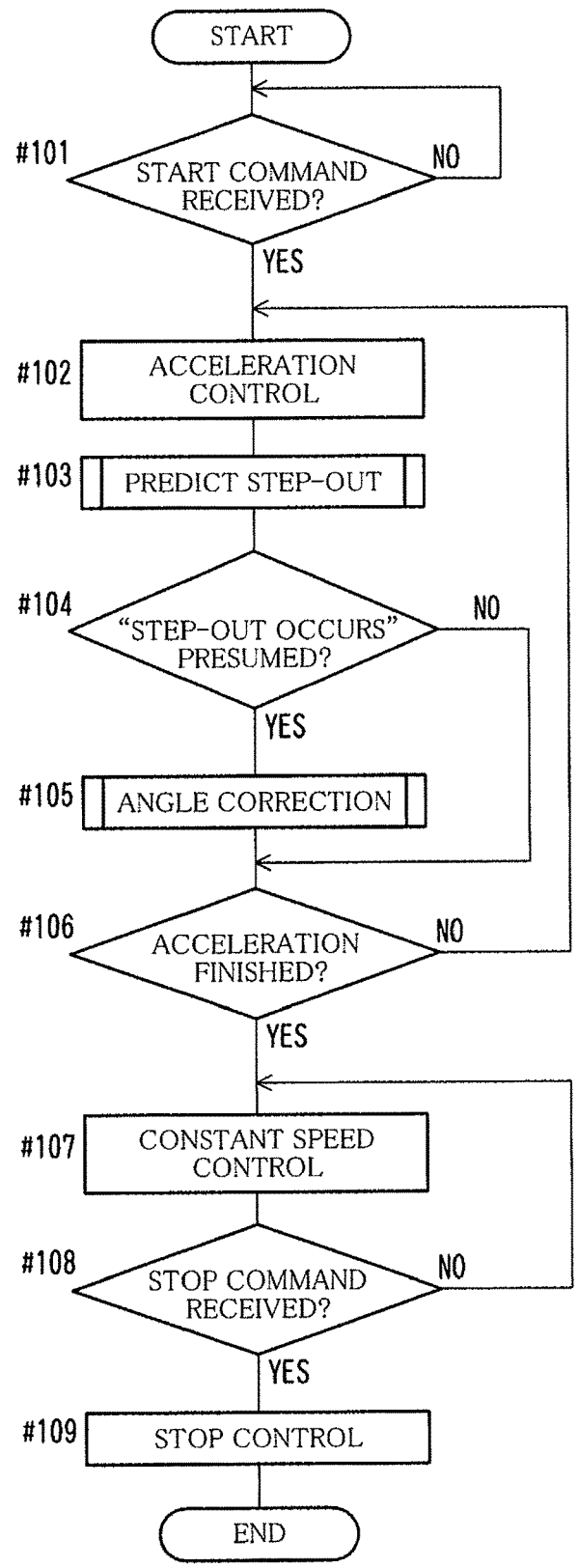
FIG. 16 is a diagram showing an example of the flow of processing in a motor controller.
Figure 17:
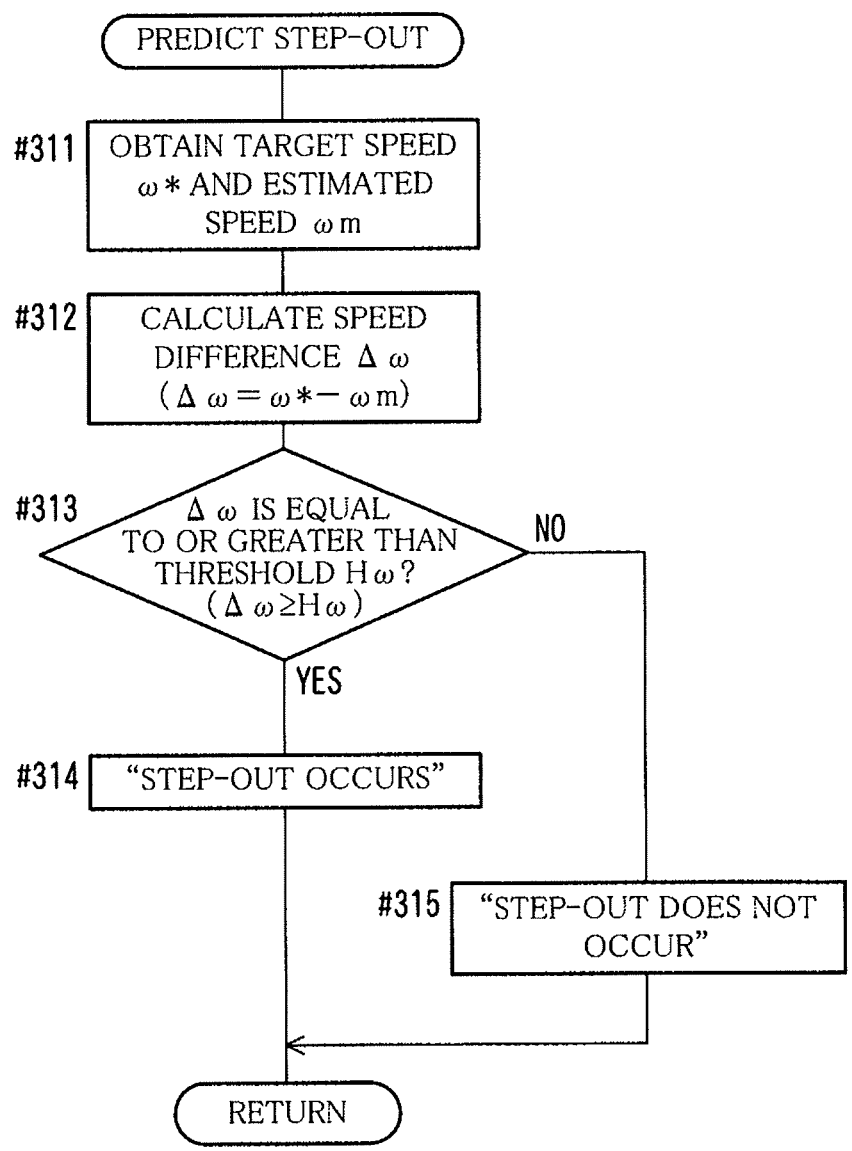
FIG. 17 is a diagram showing an example of the flow of processing for presuming a step-out.
Figure 18:
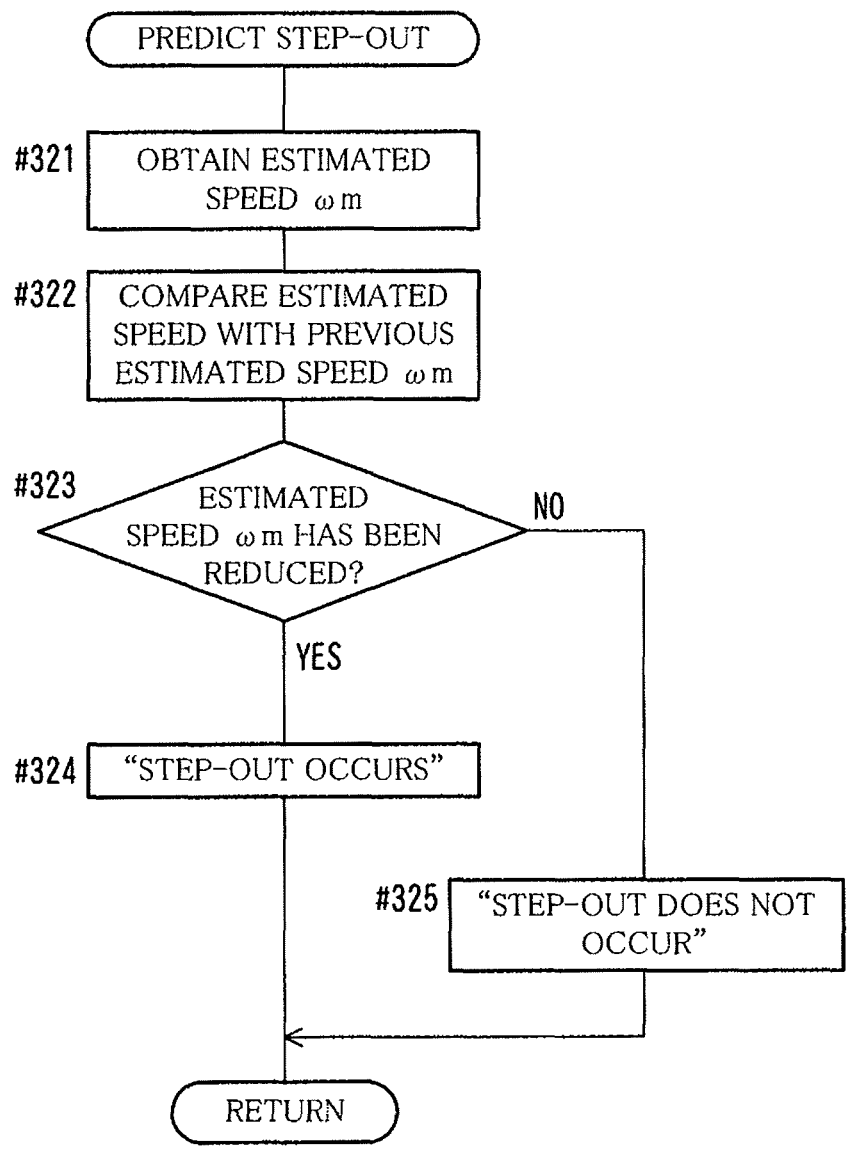
FIG. 18 is a diagram showing an example of the flow of processing for presuming a step-out.
Figure 19:
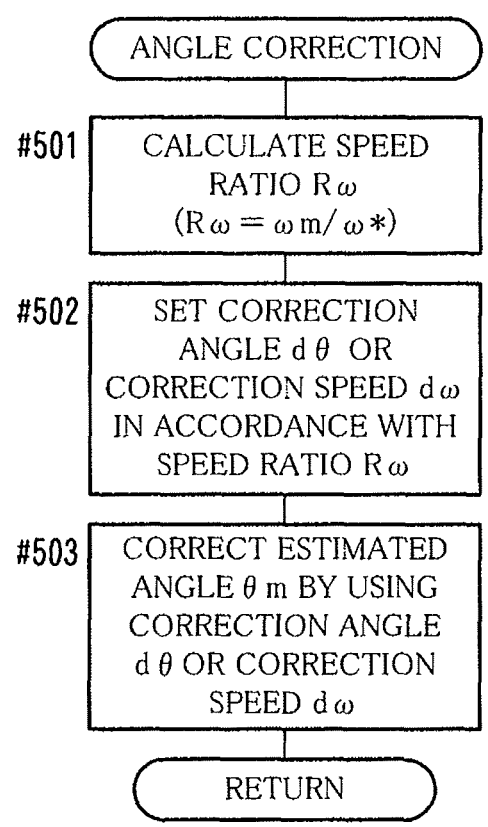
FIG. 19 is a diagram showing an example of the flow of processing for correcting an angle.

FIG. 16 depicts an example of the flow of processing in the motor controller 21, 21*b*. FIGS. 17 and 18 depict examples of the flow of processing for presuming a step-out. FIG. 19 depicts an example of the flow of processing for correcting an angle.

Referring to FIG. 16, the motor controller 21, 21*b* waits for a start command to be given by the upper control unit 20 (Step #101). The start command is given while the rotor 32 stops or the rotor 32 is so controlled to be stopped.

When the start command is given (YES in Step #101), the motor controller 21, 21*b* starts the acceleration control to make the rotation follow the target speed ω* increasing gradually (Step #102). During the acceleration, the motor controller 21, 21*b* performs processing for presuming whether or not a step-out occurs (Step #103).

Only when it is presumed that a step-out occurs (YES in Step #104), processing for angle correction is performed (Step #105). While the acceleration has not yet been finished (NO in Step #106), the motor controller 21, 21*b* continues the acceleration control and performs the processing for presuming whether or not a step-out occurs (Steps #102 and #103). Then, when it is presumed that a step-out occurs, the processing for angle correction is performed again (Steps #104 and #105).

After the acceleration is finished, namely, when the estimated speed ωm reaches the final target speed ω1 at the time of acceleration (YES in Step #106), the motor controller 21, 21*b* finishes the acceleration control to perform the constant speed control (Step #107).

Thereafter, the motor controller 21, 21*b* waits for a stop command to be given by the upper control unit 20 (Step #108). In response to the stop command given (YES in Step #108), the motor controller 21, 21*b* performs the stop control (Step #109).

Referring to FIG. 17, as the processing for presuming a step-out, the motor controller 21, 21*b* obtains the latest target speed ω* and the estimated speed ωm (Step #311) to calculate a speed difference Δω (Step #312).

After that, the motor controller 21, 21*b* determines whether or not the speed difference Δω is equal to or greater than the threshold Hω corresponding to the target speed ω* (Step #313). When determining that the speed difference Δω is equal to or greater than the threshold Hω (YES in Step #313), the motor controller 21, 21*b* presumes that a step-out occurs (Step #314). In short, as a result of the presumption, "step-out occurs" is stored. When determining that the speed difference Δω is not equal to or greater than the threshold Hω (NO in Step #313), the motor controller 21, 21*b* presumes that a step-out does not occur (Step #315).

Alternatively, as shown in FIG. 18, as the processing for presuming a step-out, the motor controller 21, 21*b* obtains the latest estimated speed ωm (Step #321) and compares the latest estimated speed ωm with the estimated speed ωm previously obtained (Step #322).

After that, the motor controller 21, 21*b* determines whether or not the estimated speed ωm has been reduced based on the result of the comparison (Step #323). When determining that the estimated speed ωm has been reduced (YES in Step #323), the motor controller 21, 21*b* presumes that a step-out occurs (Step #324). When determining that the estimated speed ωm has not been reduced (NO in Step #323), the motor controller 21, 21*b* presumes that a step-out does not occur (Step #325).

Referring to FIG. 19, the motor controller 21, 21*b* calculates a speed ratio Rω as the processing for angle correction (Step #501). The motor controller 21, 21*b* sets a correction angle dθ or a correction speed dω as the correction amount in accordance with the speed ratio Rω calculated (Step #502). The motor controller 21, 21*b* then corrects the estimated angle θm by adding the correction angle dθ to the estimated angle θm, or, by adding the correction speed dω to the estimated speed ωm used for estimating the estimated angle θm.

According to the foregoing embodiment, it is possible to provide a controller and a control method which are capable of preventing a step-out due to a difference between the actual position of magnetic poles and an estimated position thereof. For example, it is possible to prevent a step-out in the acceleration stage of making a transition from the stop state to the constant speed rotating state at the time of start.

In the foregoing embodiment, the correction angle dθ is added to the estimated angle θm. The present invention is not, however, limited to the arrangement. Instead of this, another arrangement is possible in which the correction angle dθ is set as a coefficient and the product of the estimated angle θm and the correction angle dθ may be calculated as a post-correction estimated correction angle θma. Likewise, yet another arrangement is possible in which the correction speed dω is set as a coefficient and the product of the estimated speed ωm and the correction speed dω may be calculated as a post-correction estimated correction speed ωma and the estimated angle θm is corrected.

In the foregoing embodiment, the configuration of the tables 71, 72, and 72b, and the data values are taken as examples. Other different configurations or data values may be used.

It is to be understood that the configuration of the image forming apparatus 1 and the motor controller 21, the constituent elements thereof, the content of the processing, the order of the processing, the time of the processing, and the like may be appropriately modified without departing from the spirit of the present invention.

Although embodiments of the present invention have been described and illustrated in detail, it is clearly understood that the same is by way of illustration and example only and not limitation, the scope of the present invention should be interpreted by terms of the appended claims.

What is claimed is:

1. A controller for a permanent magnet synchronous motor having a rotor using a permanent magnet, the rotor rotating by a rotating magnetic field caused by a current flowing through an armature, the controller comprising:
   a drive portion configured to feed a current to the armature to drive the rotor;
   a speed estimating portion configured to estimate a rotational speed of the rotor based on the current flowing through the armature;
   a magnetic pole position estimating portion configured to estimate a position of magnetic poles of the rotor based on an estimated speed that is the rotational speed estimated;
   a control unit configured to control, based on an estimated angle that is an estimated value of the position of magnetic poles outputted by the magnetic pole position estimating portion, the drive portion to cause the rotating magnetic field rotating at a target speed indicated in an inputted speed command;
   a step-out presuming portion configured to presume, based on the target speed and the estimated speed, whether or not a step-out occurs; and
   a correction portion configured to correct the estimated angle when the step-out presuming portion presumes that a step-out occurs; wherein
   when the correction portion corrects the estimated angle, the control unit controls, based on a post-correction estimated angle that is the estimated angle corrected by the correction portion, the drive portion to cause the rotating magnetic field depending on the target speed.

2. The controller for the permanent magnet synchronous motor according to claim 1, wherein the correction portion corrects the estimated angle outputted by the magnetic pole position estimating portion to the post-correction estimated angle.

3. The controller for the permanent magnet synchronous motor according to claim 1, wherein the correction portion corrects the estimated speed inputted to the magnetic pole position estimating portion from the speed estimating portion in such a manner that the magnetic pole position estimating portion outputs the post-correction estimated angle as the estimated angle.

4. The controller for the permanent magnet synchronous motor according to claim 1, wherein the step-out presuming portion presumes that a step-out occurs when a speed difference between the target speed and the estimated speed is greater than a threshold that is a difference between the target speed and a predetermined allowable lower limit speed.

5. The controller for the permanent magnet synchronous motor according to claim 4, wherein the allowable lower limit speed is set depending on a current set value based on which a value of the current flowing through the armature is determined and a load on the permanent magnet synchronous motor.

6. The controller for the permanent magnet synchronous motor according to claim 1, wherein the step-out presuming portion presumes that a step-out occurs when the estimated speed is reduced in a state where the drive portion is so controlled that the current flowing through the armature reaches an upper limit within a settable range.

7. The controller for the permanent magnet synchronous motor according to claim 1, wherein the correction portion performs, as processing for correcting the estimated angle, processing corresponding to operation of adding, to the estimated angle, a correction angle depending on a ratio of the estimated speed to the target speed, or, alternatively, processing corresponding to the adding operation.

8. An image forming apparatus for forming an image on paper, the apparatus comprising:
   a permanent magnet synchronous motor having a rotor using a permanent magnet, the rotor rotating by a rotating magnetic field caused by a current flowing through an armature;
   a carrier roller of which rotation is driven by the permanent magnet synchronous motor to feed the paper;
   a controller configured to control the permanent magnet synchronous motor; and
   a speed command portion configured to input a speed command to the controller; wherein
   the controller includes
      a drive portion configured to feed a current to the armature to drive the rotor,
      a speed estimating portion configured to estimate a rotational speed of the rotor based on the current flowing through the armature,
      a magnetic pole position estimating portion configured to estimate a position of magnetic poles of the rotor based on an estimated speed that is the rotational speed estimated,
      a control unit configured to control, based on an estimated angle that is an estimated value of the position of magnetic poles outputted by the magnetic pole position estimating portion, the drive portion to cause the rotating magnetic field rotating at a target speed indicated in the speed command inputted,
      a step-out presuming portion configured to presume, based on the target speed and the estimated speed, whether or not a step-out occurs, and
      a correction portion configured to correct the estimated angle when the step-out presuming portion presumes that a step-out occurs, and
   when the correction portion corrects the estimated angle, the control unit controls, based on a post-correction estimated angle that is the estimated angle corrected by the correction portion, the drive portion to cause the rotating magnetic field depending on the target speed.

9. The image forming apparatus according to claim 8, wherein the correction portion corrects the estimated angle outputted by the magnetic pole position estimating portion to the post-correction estimated angle.

10. The image forming apparatus according to claim 8, wherein the correction portion corrects the estimated speed inputted to the magnetic pole position estimating portion from the speed estimating portion in such a manner that the magnetic pole position estimating portion outputs the post-correction estimated angle as the estimated angle.

11. The image forming apparatus according to claim 8, wherein the step-out presuming portion presumes that a step-out occurs when a speed difference between the target speed and the estimated speed is greater than a threshold that is a difference between the target speed and a predetermined allowable lower limit speed.

12. The image forming apparatus according to claim 11, wherein the allowable lower limit speed is set depending on a current set value based on which a value of the current flowing through the armature is determined and a load on the permanent magnet synchronous motor.

13. The image forming apparatus according to claim 8, wherein the step-out presuming portion presumes that a step-out occurs when the estimated speed is reduced in a state where the drive portion is so controlled that the current flowing through the armature reaches an upper limit within a settable range.

14. The image forming apparatus according to claim 8, wherein the correction portion performs, as processing for correcting the estimated angle, processing corresponding to operation of adding, to the estimated angle, a correction angle depending on a ratio of the estimated speed to the target speed, or, alternatively, processing corresponding to the adding operation.

15. A method for controlling a permanent magnet synchronous motor having a rotor using a permanent magnet, the rotor rotating by a rotating magnetic field caused by a current flowing through an armature, the method comprising:
   presuming, based on a target speed and an estimated speed that is an estimated value of a rotational speed of the rotor, whether or not a step-out occurs;
   correcting, when it is presumed that a step-out occurs, an estimated angle that is an estimated value of a position of magnetic poles of the rotor; and
   controlling, based on a post-correction estimated angle that is the estimated angle after the correction, a current flowing through the armature to cause the rotating magnetic field rotating at the target speed.

16. The method according to claim 15, wherein, in presuming whether or not the step-out occurs, when a speed difference between the target speed and the estimated speed is greater than a threshold that is a difference between the target speed and a predetermined allowable lower limit speed, it is presumed that the step-out occurs.

17. The method according to claim 16, wherein the allowable lower limit speed is set depending on a current set value based on which a value of the current flowing through the armature is determined and a load on the permanent magnet synchronous motor.

18. The method according to claim 15, wherein, in presuming whether or not the step-out occurs, when the estimated speed is reduced in a state where the drive portion is so controlled that the current flowing through the armature reaches an upper limit within a settable range, it is presumed that the step-out occurs.

19. The method according to claim 15, wherein, as processing for correcting the estimated angle, processing corresponding to operation of adding, to the estimated angle, a correction angle depending on a ratio of the estimated speed to the target speed is performed, or, alternatively, processing corresponding to the adding operation is performed.

* * * * *